United States Patent [19]

Tomino

[11] Patent Number: 4,464,034
[45] Date of Patent: Aug. 7, 1984

[54] DEVICE FOR ELECTRICALLY CONNECTING LENS AND CAMERA

[75] Inventor: Naoki Tomino, Tokyo, Japan
[73] Assignee: Nippon Kogaku K.K., Tokyo, Japan
[21] Appl. No.: 439,534
[22] Filed: Nov. 5, 1982

[30] Foreign Application Priority Data

Nov. 13, 1981 [JP] Japan ............................ 56-169154[U]
Nov. 13, 1981 [JP] Japan ................................ 56-181978

[51] Int. Cl.³ ............................................. G03B 17/12
[52] U.S. Cl. ..................................................... 354/286
[58] Field of Search ...................... 354/286, 455, 195.1; 350/257

[56] References Cited

U.S. PATENT DOCUMENTS 4,130,358 12/1978 Lang et al. ...................... 354/286 X
4,269,497 5/1981 Ishizaka et al. ...................... 354/286
4,416,526 11/1983 Iomori et al. ................... 354/286 X
4,417,798 11/1983 Ohkura et al. .................. 354/286 X

*Primary Examiner*—John Gonzales
*Attorney, Agent, or Firm*—Fitzpatrick, Cella, Harper & Scinto

[57] ABSTRACT

A connector electrically connects, an electric circuit in an interchangeable lens with an electric circuit in a camera body. The connector includes plural contacts provided on the interchangeable lens and the corresponding plural contacts provided on the camera body. Power supplying contacts in the plural contacts on the camera body are activated only after the interchangeable lens has been completely or mounted on the camera body.

8 Claims, 9 Drawing Figures

DEVICE FOR ELECTRICALLY CONNECTING LENS AND CAMERA

BACKGROUND OF THE INVENTION

1. Field of the Invention

The present invention relates to a connector device for electrically connecting an electric circuit in an interchangeable lens and an electric circuit in a camera body.

2. Description of the Prior Art

With the marked increase of electronics in camera mechanisms in recent years, there have been proposed various electric connectors provided between a camera body and an interchangeable lens for electrically transmitting the lens data, such as the fully open aperture value or focal length, to said camera body. The power source for an electric circuit for generating such data is generally incorporated in the camera body. Also as a result of recent progress in the automatic cameras, the automatic focusing function is being applied to to cameras with interchangeable lenses, involving exchange of plural signals for automatic focusing between the camera body and the interchangeable lens. The camera system with such automatic focusing function may assume various forms accordng to the positioning of elements of the automatic focusing device, such as the drive source for moving the photographing optical system, focus detector and power source, but in a most advantageous system the first one is placed in the interchangeable lens while the latter two are placed in the camera body. In such system a number of connecting contacts have to be provided in the mount for fixing the interchangeable lens to the camera body, and the power supplying contacts of the camera body may accidentally touch the contacts for other purposes in the lens, causing undesirable effects or damage in the electric circutis in said lens, when it is mounted to or dismounted from the camera body.

SUMMARY OF THE INVENTION

The object of the present invention is to provide a connector device not associated with the abovementioned drawbacks and capable of positioning a large number of connecting contacts within a limited area of the mount, without electrical interferences among said contacts.

A feature of the connector device of the present invention resides in the fact that the interchangeable lens is provided with plural electric contacts along a circle in a plane perpendicular to the optical axis of said lens, and that the power supplying corresponding contacts on the camera body are activated only after the interchangeable lens is completely mounted on the camera body.

DESCRIPTION OF THE PREFERRED EMBODIMENTS

Figure 1:
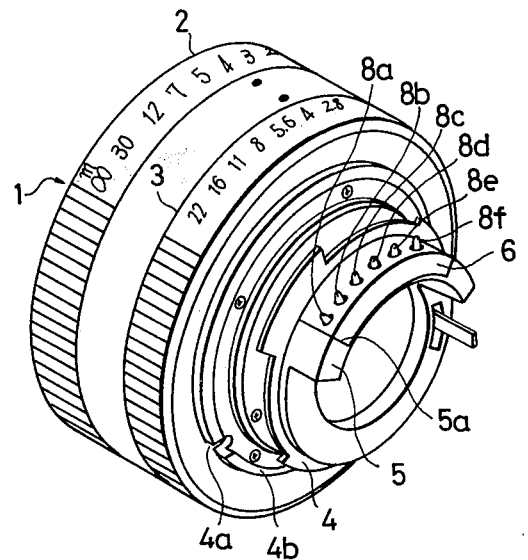
FIG. 1 is a perspective view of an interchangeable lens representing a first embodiment of the present invention.
Figure 2:
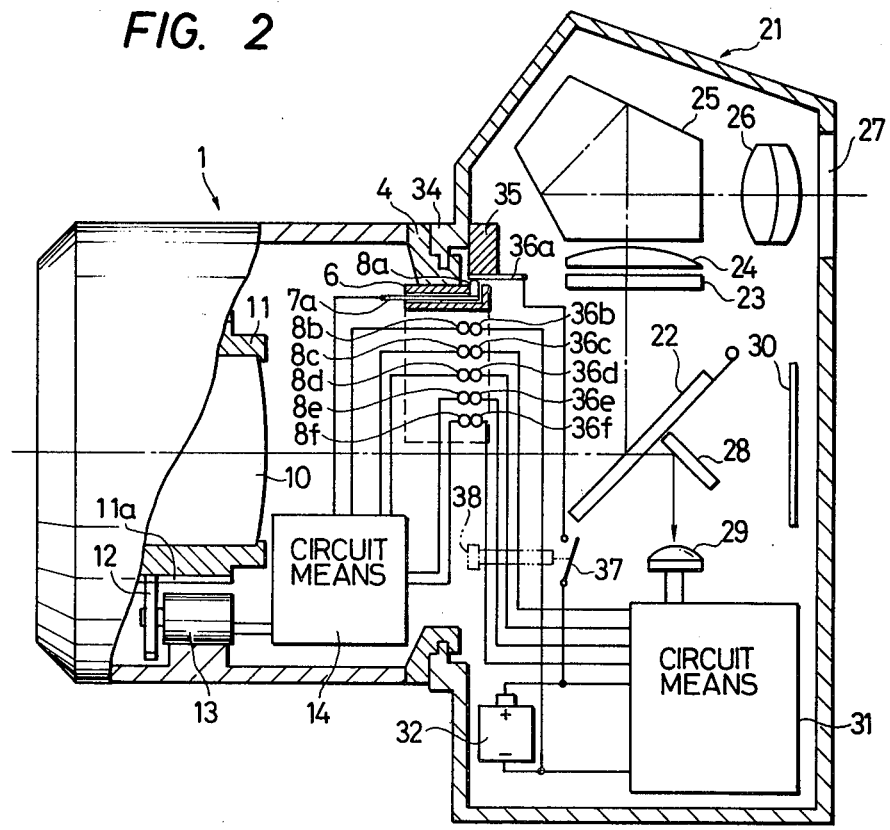
FIG. 2 is a cross-sectional view showing optical and electrical elements in a camera with the interchangeable lens of FIG. 1 mounted thereon.
Figure 3:
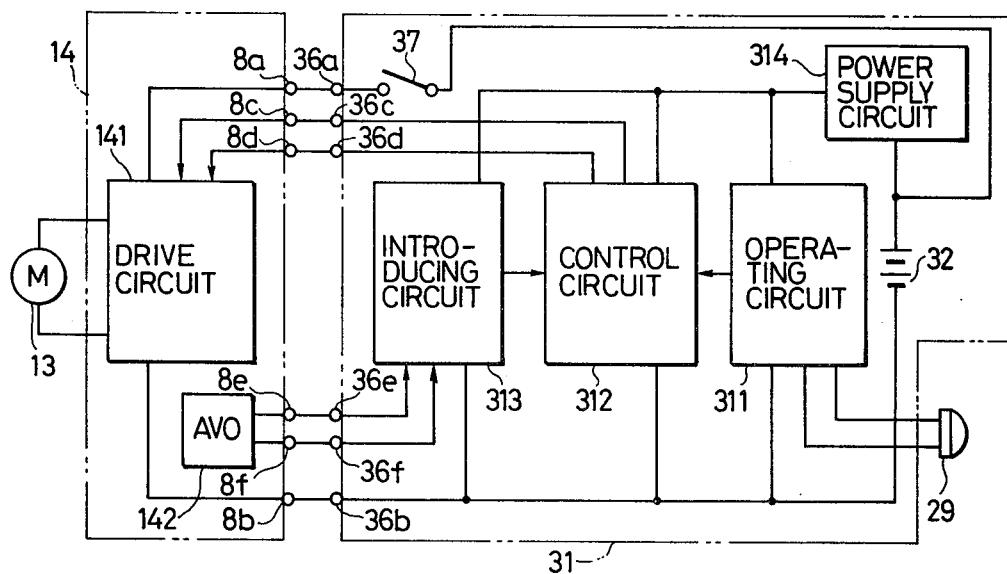
FIG. 3 is a block diagram showing circuit means in FIG. 2.

Referring to FIG. 1 showing an embodiment of the present invention, an interchangeable lens 1 is provided with a distance adjustment ring 2, a diaphragm adjustment ring 3, a bayonet mount 4 and a lens protecting ring 5, and in a recess 5a thereof an insulating support member 6 is firmly fitted and fixed inside said mount 4. As partly shown in FIG. 2, the support member 6 supports plural conductive plate springs 7a–7f, having semispherical contacts 8a–8f on the free ends of said springs. Further, referring to FIG. 2, a movable tube 11 supporting a movable lens 10 and coupled by a helicoid mechanism to the internal periphery of the lens tube 1 is linked, by a gear 11a provided on the outer periphery of said movable tube 11, to a driving gear 12 of a motor 13. Consequently the lens tube 11 and the lens 10 axially move with rotation, by the rotation of said motor 13, to focus the image onto a film plane 30 in the camera body. As shown in FIG. 3, circuit means 14 comprises a driving circuit 141 for driving the motor 13 forward or backward or stopping it, and an aperture information circuit 142 for generating a signal indicating the fully open aperture value $Av_0$ of the lens.

In a camera body 21 there is provided a main mirror 22 for reflecting the light coming through the lens 10 toward a finder optical system composed of a focusing plate 23, a condenser lens 24, a pentagonal prism 25 and an eyepiece lens 26, whereby the image on the focusing plate can be observed through a finder eyepiece 27. The light transmitted by a semitransparent part of the main mirror 22 and reflected downwardly by a subsidiary mirror 28 is received by a detector 29. The photoelectrically converted output signal from the detector 29 is processed by an operating circuit 311 of the circuit means 31 to provide an output signal indicating the focusing position of the photographing lens, and said signal is supplied to a control circuit 312 for supplying an output signal for controlling the rotation of the motor 13 to the driving circuit 141.

Inside a mount 34 of the camera body for detachably supporting the bayonet mount 4 of the lens, there is provided an insulating support member 35, supporting thereon conductive contacts 36a–36f. An output signal from an aperture information circuit 142 provided in the lens tube is supplied through the contacts 8e, 8f; 36e, 36f to an information introducing circuit 313 and then to the control circuit 312, which accordingly regulates the functions of the detector and motor and effects computation for exposure control. The circuits 311, 312, 313 are powered by a power supply circuit 314 connected to a battery 32, which also powers a driving circuit 141 of the interchangeable lens through the contacts 36a, 36b; 8a, 8b.

Figure 4:
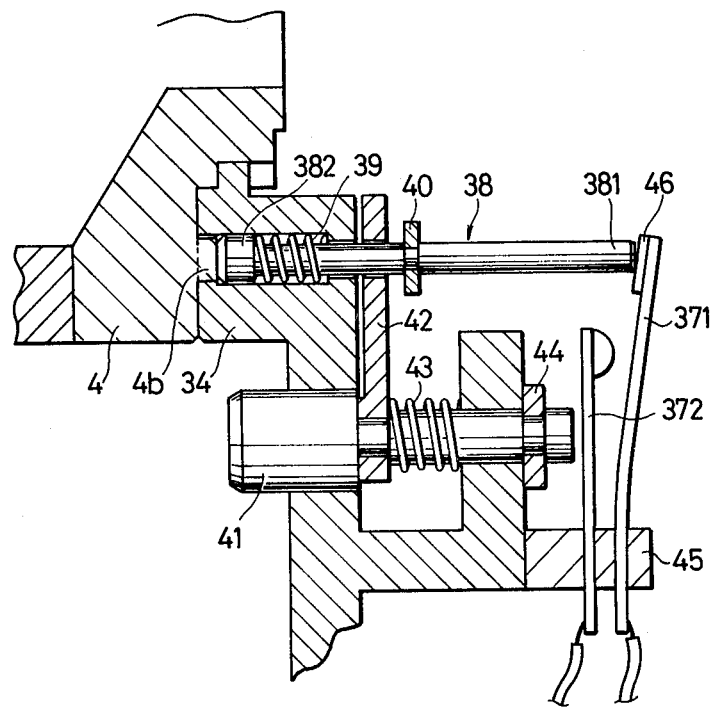
FIG. 4 is a cross-sectional view showing switch devices in the embodiment shown in FIG. 2.

Between the anode of said battery 32 and the contact 36a there is provided a switch 37 to be explained later and constructed as shown in FIG. 4. FIG. 4 shows a state in which the bayonet mount 4 of the lens is inserted in the mount 34 of the camera, in the course of mounting the lens tube onto the camera body, and said mounting operation is to be completed by rotating the mount 4 by a determined angle around the optical axis from the illustrated state. A pin 38 slidably provided in the vicinity of the lens mount 34 is biased towards left, as viewed, by a compression spring 39 but the movement thereof is limited by a limiting ring 40. Said pin 38 is linked, through a link plate 42, with an operating button 41, which is biased towards the left by a compression spring 43 together with said link plate 42 but movement of which is limited by a limiting ring 44. A movable contactor 371 engaging with an end of the pin 38 and a fixed contactor 372 are both fixed on an insulating member 45 to constitute the aforementioned switch 37.

Figure 5:
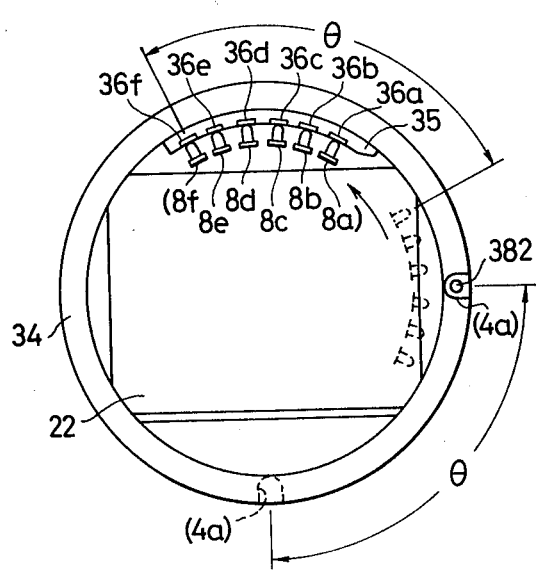
FIG. 5 is a front view of a lens mount in the camera illustrated in FIG. 2, showing the arrangement of contacts therein.

Upon insertion of the mount 4 of the lens tube into the mount 34 of the camera body, a head portion 382 of said pin 38 is pressed towards the right to the illustrated position by an annular projection 4b of the bayonet mount 4, whereby the end 381 of the pin 38 pushes an insulating sheet 46 to separate the movable contactor 371 from the fixed contactor 372, thereby opening the switch 37. In this state, as shown by broken lines in FIG. 5, a recess 4a in the lens mount is spaced, by an angle $\theta$, from the pin head 382. A subsequent anticlockwise rotation of the lens tube by the angle $\theta$ bring the contacts 8a-8f on the lens to the full-lined positions, thus making respective connections with the contacts 36a-36f on the camera. Simultaneously the mount recess 4a is rotated anticlockwise from the broken-lined position to the full-lined position, whereby the head 382 of the pin 38 engages with the recess 4a by the function of the compression spring, thus completing the mounting operation of the interchangeable lens on the camera body. At the same time the end 381 of said pin 38 moves to the left in FIG. 4, whereby the movable contactor 371 returns to the original position by the elastic force thereof and touches the fixed contactor 372, thus closing the switch 37.

When the lens is to be removed from the camera body, the operating button 41 is depressed, whereby the link plate 42 moves to the right together with said button 41 to displace the limiting ring 40 and the pin 38 to the right. Thus the end of said pin 38 pushes the movable contactor 371 away from the fixed contactor 372, thus opening the switch 37. Simultaneously, the head 382 of the pin 38 is extracted from the recess 4a to the right, thus enabling the lens to rotate with respect to the mount. Even if the operating button 41 is released during the rotation of the bayonet mount 4, the pin 38 is supported in the displaced position by the projecting portion 4b of said mount, thus maintaining the switch 37 in the opened state.

In the foregoing embodiment there is provided switch means for interrupting the connection to the power supply during the mounting or dismounting operation of the lens. In the following embodiments, however, said switch means is dispensed with by particular arrangements of the contacts.

Figure 6:
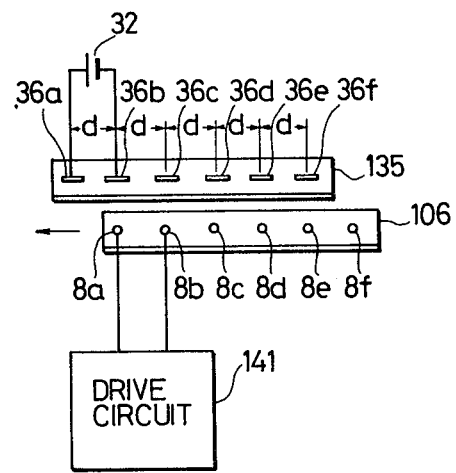
FIG. 6 is a schematic view showing the connector arrangement in a second embodiment of the present invention.
Figure 7A:
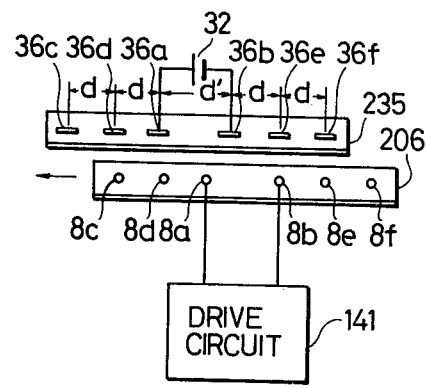
FIGS. 7A and 7B are schematic views showing the connector arrangement in a third embodiment of the present invention.
Figure 7B:
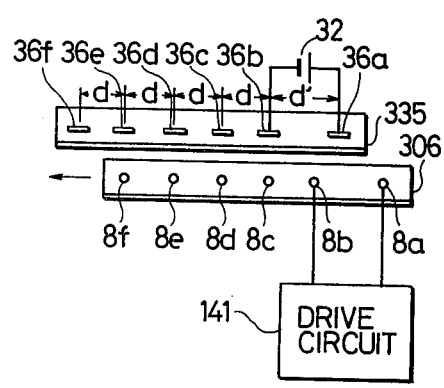

In an embodiment shown in FIG. 6, a support member 135 is provided, opposite to the first-mentioned embodiment, with a contact 36a connected to the anode of the battery 32 at the left end position, so that said contact 36a does not touch any contact of the interchangeable lens until it is brought into contact with the corresponding contact 8a provided on a support member 106 of the lens. In this manner it is possible to avoid eventual damage in the circuit resulting from erroneous connection with other contacts. Also in embodiments shown in FIGS. 7A and 7B, the distance d' of contacts 36a, 36b connected to the battery is made different from the distance d between other contacts, for example d'=d±d/2, so that said contacts 36a and 36b do not simultaneously but alternately touch the contacts of the interchangeable lens during rotation thereof, and simultaneously touch the corresponding contacts 8a, 8b only at the end of said rotation to form power supplying lines. Also in an embodiment shown in FIG. 8, the respective distances between neighboring contacts are selected so as to be different, so that two simultaneous connections are never made between the contacts 8a-8f on the interchangeable lens and the contacts 36a-36f on the camera body. In order to achieve such objective said distances can be selected for example to satisfy d1=6, d2=8, d3=10, d4=12 and d5=16 or d1=6, d2=9, d3=12, d4=18 and d5=24. In this embodiment the contacts 8a-8f and 36a-36f may be arranged in the inverse order in the lateral direction.

Figure 8:
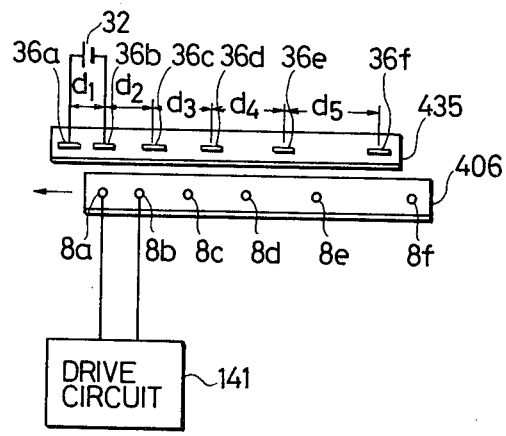
FIG. 8 is a schematic view showing the connector arrangement in a fourth embodiment of the present invention.

Furthermore, in case the contact 36a connected to the anode of the battery 32 at the left end position (when the interchangeable lens is mounted by anticlockwise rotation) as shown in FIG. 6 or 8, the contacts 8b and 36b may be dispensed with by connecting the cathode of the battery 32 to the mount 34 on the camera body and connecting a power supply terminal of the driving circuit to the bayonet mount 4 of the lens.

I claim:

1. A camera provided with plural connector means in a mount for fixing a photographing lens, for electrically connecting an electric device provided in said photographing lens with an electric device provided in the camera body, comprising:
   (a) means for electric power supply to said electric devices; and
   (b) means for connecting said power supply means to one of said plural connector means, wherein said connecting means comprises switch means, and actuating means adapted for actuating said switch means to electrically separate said one of said connector means from said power supply means until the mounting operation of said photographing lens is completed.

2. A camera according to claim 1, wherein said power supply means and said connecting means are provided in said camera body.

3. A camera according to claim 2, wherein said camera body comprises locking means adapted to be displaced upon completion of the mounting of said photographing lens thereby maintaining said lens in the mounted state, and wherein said actuating means is adapted to actuate said switch means in response to the displacement of said locking means thereby connecting said power supply means to said one of said connector means.

4. In a camera system with a camera body and a photographing lens detachable therefrom wherein an electric device provided in said photographing lens is electrically connected through plural connector means to an electric device provided in the camera body, a power supply device for supplying electric power to the electric device in said photographing lens comprising:

(a) a power supply source provided in said camera body and
(b) means for connecting said power supply source to one of said plural connector means, wherein said connecting means comprises switch means, and actuating means adapted for actuating said switch means to electrically separate said one of said connector means from said power supply source until the mounting operation of said photographing lens is completed.

5. In a camera system with a camera body and a photographing lens detachable therefrom, a connector device provided in a mount for fixing said photographing lens to said camera body for electrically connecting an electric device provided in the photographing lens with an electric device including a power supply source and provided in the camera body, comprising:
(a) plural connector means provided in said mount along a circle in a plane perpendicular to the optical axis of said photographing lens, wherein said connector means comprises a first group of contacts provided on said camera body and a second group of contacts provided on said photographing lens and corresponding respectively to the contacts of said first group;
(b) connection means for connecting said electric devices respectively to said connector means, wherein said connection means comprises means for connecting said electric power supply source to a selected pair of contacts in said first group; and
(c) support means for supporting said plural connector means in a determined positional relationship in such a manner that said selected pair of contacts is brought into simultaneous contact with a pair of contacts in said second group only when the mounting of said photographing lens on said camera body is completed.

6. A system device according to claim 5, including mount means involving an operation for rotating said photographing lens about the optical axis thereof for mounting said lens on said camera body, and said support means positions one of the contacts in said selected pair connected to said electric power supply source at an end position of the contacts in said first group with respect to the rotating direction of said photographing lens.

7. A system according to claim 5, wherein the spacing of the contacts of said selected pair is selected to be different from that of other contacts in said first group.

8. A system device according to claim 5, wherein the spacing of the neighboring contacts in said first group are mutually different.

* * * * *

UNITED STATES PATENT AND TRADEMARK OFFICE
CERTIFICATE OF CORRECTION

PATENT NO. : 4,464,034

DATED : August 7, 1984

INVENTOR(S) : NAOKI TOMINO

It is certified that error appears in the above-identified patent and that said Letters Patent is hereby corrected as shown below:

IN THE ABSTRACT:

Line 8, delete "or".

Column 1, line 21, change "to" (second occurrence) to --the--;

Claim 6, line 1, delete "device".
Claim 8, line 1, delete "device".

Signed and Sealed this

Twenty-fifth Day of December 1984

[SEAL]

Attest:

GERALD J. MOSSINGHOFF

Attesting Officer

Commissioner of Patents and Trademarks